Oct. 2, 1945. W. H. STANGLE 2,386,070
STATIONARY BROILING RACK
Filed June 12, 1943
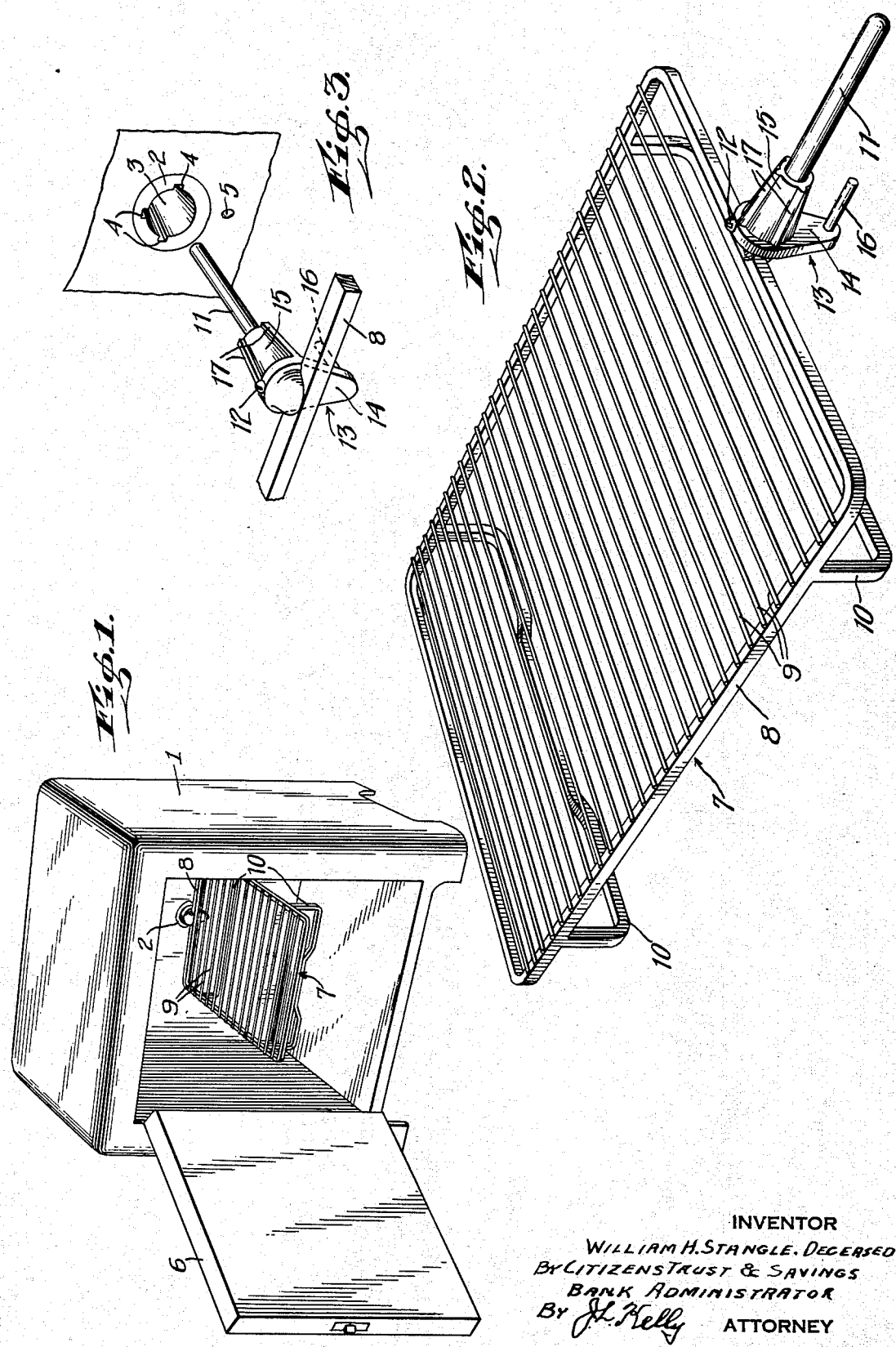
INVENTOR
WILLIAM H. STANGLE, DECEASED
BY CITIZENS TRUST & SAVINGS
BANK ADMINISTRATOR
By J. H. Kelly ATTORNEY Patented Oct. 2, 1945

2,386,070

UNITED STATES PATENT OFFICE 2,386,070

STATIONARY BROILING RACK

William H. Stangle, deceased, late of Evansville, Ind., by Citizens Trust & Savings Bank, administrator, Evansville, Ind., assignor to Servel, Inc., New York, N. Y., a corporation of Delaware Application June 12 1943, Serial No. 490,669

2 Claims. (Cl. 99—340)

This invention relates to a broiling apparatus, and more particularly to a device for broiling foods wherein there is no need for turning the food during the broiling operation, as when the food is to be broiled on only one side. In other words, where a stationary grill is used as contrasted with a turning grill, such, for example, as that described and claimed in copending companion application Serial No. 487,733, filed May 20, 1943.

The term "broiling" is herein used to describe the action of the heat on the food. The food is given a palatable and desirable flavor differing very much from that provided by ordinary roasting or frying operations. It is generally accepted that broiled foods are superior to foods which have been fried or roasted, not only from the standpoint of taste, but also from the standpoint of digestive and nutritional value.

In broilers generally, there is usually provided a tray for supporting the food to be broiled. This tray is usually relatively massive and is supported in the broiling chamber in such a manner that it becomes very hot during the cooking operation, with the result that the food instead of being broiled, as intended, is only partially broiled, the rest of the cooking being by frying or roasting.

It is a primary object of this invention to provide a broiling chamber wherein a stationary openwork grill is supported in such manner that there is a minimum of contact between the grill and the chamber walls, and also between the grill and the food supported thereby.

Further objects and advantages of this invention will readily occur to those skilled in the art upon reference to the following description and accompanying drawing of which:

Fig. 1 is a perspective view of a broiling chamber with the improved stationary grill supported therein.

Fig. 2 is a perspective view of the improved grill.

Fig. 3 is an exploded view showing a portion of the rear wall of the chamber and a supporting means for the improved grill.

In the embodiment of this invention illustrated, there is provided a broiling chamber designated generally by the numeral 1. At the top of this chamber there is provided any convenient source of heat, preferably a radiant heater (not shown). The chamber walls, except for the rear wall, are free of all obstructions, supporting shelves, or the like. In the rear wall of the chamber there is provided a rotatable chuck 2 disclosed and claimed in the companion application Serial No. 487,733 referred to above. This chuck is provided with a central opening 3 extending therethrough and a plurality of spaced grooves 4 adapted to detachably receive and support the stationary grill 7. The rear wall is also provided with an opening 5 to be referred to hereinafter. A door 6 is provided to close the broiling chamber when not in use.

The stationary grill consists of a rectangular frame 8 upon which is located a plurality of wire rods 9 equally spaced throughout the length of said frame. Attached to the frame 8 are two U-shaped supports 10 adapted to support the grill clear of a working surface, such as a table, when the grill is removed from the broiling chamber. At the center of the right end of the frame 8, as viewed in Fig. 2, there is located a supporting shaft 11 adapted to fit into the opening 3 of the chuck 2 in the rear wall of the chamber. Detachably secured to this shaft 11 as by a screw 12, is an anchor element 13. This anchor element is made up of a plate-like member 14 having a hub 15 and a pin 16 extending therefrom. Hub 15 is formed with three splines 17 which are adapted to engage in grooves 4 of the chuck 2 and when these splines are so engaged the pin 16 is engaged in the opening 5 in the rear wall of the broiling chamber to prevent rotation of the grill relative to the chamber.

The broiling chamber has been shown herein as a separate element. However, this invention may obviously be incorporated in the broiler of a conventional cooking range.

What is claimed is:

1. In a broiler having a chamber accessible from the front and provided in its rear wall with a rotatable chuck for turning a removable spit or grill, a stationary grill having a part adapted to be engaged by said chuck for supporting the grill in said chamber, and a pair of elements adapted for mutual engagement when in alignment and upon movement of said grill part toward engagement by said chuck, said elements being so formed and arranged as to be in alignment when said grill is in its desired position in said chamber and when in mutual engagement to prevent rotation of the grill.

2. A broiler structure as set forth in claim 1 in which one of said elements is formed by a part of the rear wall having an opening therein, and the other element includes a pin adapted to be inserted in said opening and projecting from said grill, said pin and hole being eccentric to said grill part and said chuck.

CITIZENS TRUST & SAVINGS BANK,
Administrator of the Estate of William H. Stangle, Deceased,
By ADOLPH C. FROELICH,
Vice-Pres.